Jan. 30, 1951 G. H. NORQUIST 2,539,463
COUNTER TOP CONSTRUCTION
Filed Feb. 10, 1947 5 Sheets-Sheet 1

INVENTOR
Glenn H. Norquist
BY
Austin, Wilhelm & Carlson
ATTORNEYS

Jan. 30, 1951 G. H. NORQUIST 2,539,463
COUNTER TOP CONSTRUCTION
Filed Feb. 10, 1947 5 Sheets-Sheet 2

INVENTOR
Glenn H. Norquist
BY
Austin, Wilhelm + Carlson
ATTORNEYS Jan. 30, 1951  G. H. NORQUIST  2,539,463
COUNTER TOP CONSTRUCTION
Filed Feb. 10, 1947  5 Sheets-Sheet 3

INVENTOR
Glenn H. Norquist
BY
Austin, Wilhelm & Carlson
ATTORNEYS

Jan. 30, 1951 G. H. NORQUIST 2,539,463
COUNTER TOP CONSTRUCTION
Filed Feb. 10, 1947 5 Sheets-Sheet 4

INVENTOR
Glenn H. Norquist
BY
Austin, Wilhelm & Carlson
ATTORNEYS

Jan. 30, 1951  G. H. NORQUIST  2,539,463
COUNTER TOP CONSTRUCTION
Filed Feb. 10, 1947  5 Sheets-Sheet 5

INVENTOR
Glenn H. Norquist
BY
Austin, Wilhelm & Carlson
ATTORNEYS

Patented Jan. 30, 1951

2,539,463

UNITED STATES PATENT OFFICE 2,539,463

COUNTER TOP CONSTRUCTION

Glenn H. Norquist, Jamestown, N. Y.

Application February 10, 1947, Serial No. 727,583

10 Claims. (Cl. 311—106)

This invention relates to an improved counter top construction, and more particularly to a counter top having facing surfaces formed of bright sheet metal supported and reinforced by backing sections of fibrous material and designed to provide a work table for cabinets and like supporting structures, the table top being adapted to have one or more sink wells and like working facilities associated therewith.

In accordance with this invention a metal clad counter top construction is provided presenting facing surfaces formed from a sheet of bright or polishable metal such as stainless steel, Monel-metal, brass, copper, zinc, tin or the like. The counter construction is such that the facing surfaces thereof are all formed from a single sheet of facing metal of substantially rectangular form which may be polished and finished on one side prior to cutting, shaping and bending thereof. The metal surfacing sheet is stiffened and reinforced by sections of fibrous material which may comprise laminated plywood, hard pressed fibre or composition board as commonly used in the building industry. These fibrous backing sections are adhesively bonded to the rear face of the metal facing sheet prior to bending or shaping formation of the metal sheet. The fibrous backing sections thus prevent wrinkling, warping or other undesired distortions of the metal sheet during shaping and bending thereof into counter top form, and in addition insures stiffness, strength and rigidity to the counter construction, provides a sound deadening effect so that the metal facing surfaces will not reverberate or produce a metallic ring when drummed upon, and in addition permits the use of a relatively light gauge metal facing sheet which can be worked and shaped with relative ease.

The polished metal facing sheet with the backing sections attached thereto are shaped to provide depending apron sections extending around the front and sides of the horizontal table section, the rear edge of the table section being shaped to provide an upwardly extending splash panel section. The depending apron sections and the splash panel section may be made in any desired depth or height and the top horizontal working section may be made in any desired length and width dimension, and the raised rim formations formed in the metal facing sheet may extend around the front and side edges of the horizontal working section.

The horizontal table area of the metal sheet may be provided with one or more sink well openings into which a sink well is inserted. The sink well may be stamped or pressed from a sheet of bright metal of the desired gauge. The upper edge of the sink well is soldered or welded to the adjacent edges of the metal facing sheet which define the sink well opening. All areas of the metal sheet, including the horizontal table top section, the depending apron sections, the vertical splash section and the raised rim formations are backed up and firmly seat against the underlying fibrous backing sections, providing a construction of great strength and yet relatively light in weight.

The depending apron sections of the metal facing sheet may be provided with inturned flange sections which may or may not be backed up by fibrous backing sections as desired. Wood edging strips are preferably fitted under the inturned flange sections and secured in position to provide a stiffening frame-work for the horizontal table top section and the depending flange sections. The area within the wood edging strips may also be filled in with filler boards of wood or fibrous material which may be cemented in position and may have a notching interlock with the surrounding wood edging strips.

The splash panel is formed to present a metal facing over the vertical splash section, the horizontal ledge section, and the end sections thereof. The horizontal ledge section and end sections of the splash panel may be of any desired width, and are provided with inturned metal flange sections which may or may not be backed up with fibrous backing sections as desired. Wood edging strips are fitted under the inturned metal flange sections of the splash panel, and the area defined by these edging strips may be filled in with filler boards of fibrous material secured in position by suitable cement and by notched interlocks with the surrounding edging strips.

The metal facing surface of the vertical splash section is integrally joined to the metal facing surface of the horizontal table section by a rounded curvature of the metal sheet, which rounded curvature is backed and stiffened by a wood stiffening bar fitted to the rear face thereof. This stiffening bar serves as a common framing member for the wood edging strips associated with the horizontal table section and the splash section of the construction.

This improved counter construction is particularly designed to provide a minimum of crevices in the metal facing sheet. To give the completed construction a more finished appearance a seam of welding or soldering metal may be applied to the depending corners of the apron sections and to the upper horizontally extending corners of the splash section. Sheet metal corner shoes may be applied to the ends of the rear stiffening bar and welding or soldering metal applied to the adjacent seams.

This improved construction is particularly designed to be applied to the top of wood or metal cabinets and like supporting structures to provide a highly useful working surface therefor. The horizontal working section of this improved counter construction may be equipped with one or more sink wells to provide a highly useful and attractive sink with adequate horizontal working areas and drain board areas. The raised rim formation which surrounds the horizontal table sections may be made of sufficient height to prevent the spilling of liquids from the working area, and rear splash panel section is designed to fit against the building wall. This improved construction may be equipped with faucets and other plumbing facilities as desired.

This improved metal clad counter top provides a construction which is completely faced by a single sheet of bright metal covering all exposed surfaces thereof, and which is formed and shaped to avoid the presence of cracks, crevices or breaks therein which might provide the source of leaks or lodgments for foreign matter. This improved counter top possesses great strength, and yet is relatively light in weight, presents an appealing and attractive appearance, is lasting and durable in use, will not become deformed or misshaped during manufacture, handling or while in use, and can be manufactured at substantially less cost than metal clad counters and sinks of this type heretofore provided.

An object of this invention is to provide a metal clad counter top construction which can be manufactured at relatively low cost, which presents a continuous integral metal facing surface substantially free of crevices, which is durable, strong and lasting in use and yet relatively light in weight, and which is attractive and pleasing in appearance.

Other objects and advantages of this invention will become apparent as the disclosure proceeds.

Although the characteristic features of the invention will be particularly pointed out in the claims appended hereto, the invention itself, and the manner in which it may be carried out, may be better understood by referring to the following description taken in connection with the accompanying drawings forming a part hereto, in which

Similar reference characters refer to similar parts throughout the several views of the drawings and specification.

Figure 1:
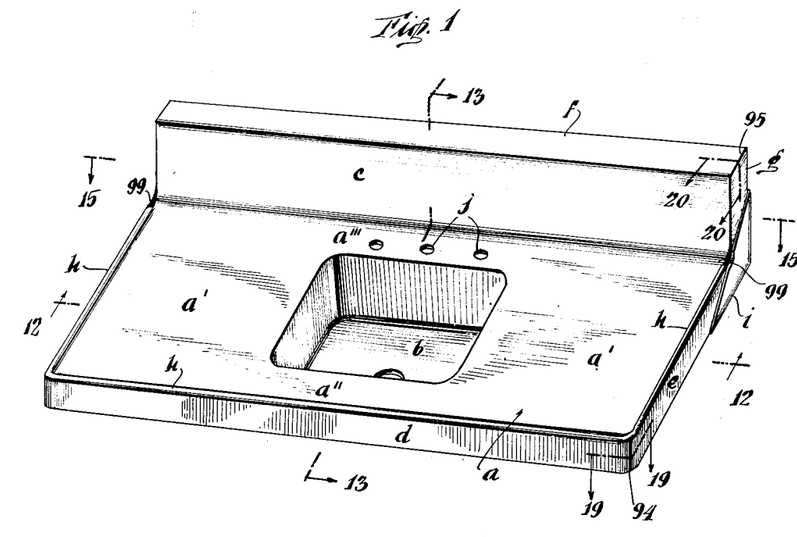
Fig. 1 is a perspective view of the fully assembled counter top having a single sink well, constructed in accordance with this invention.
Figure 2:
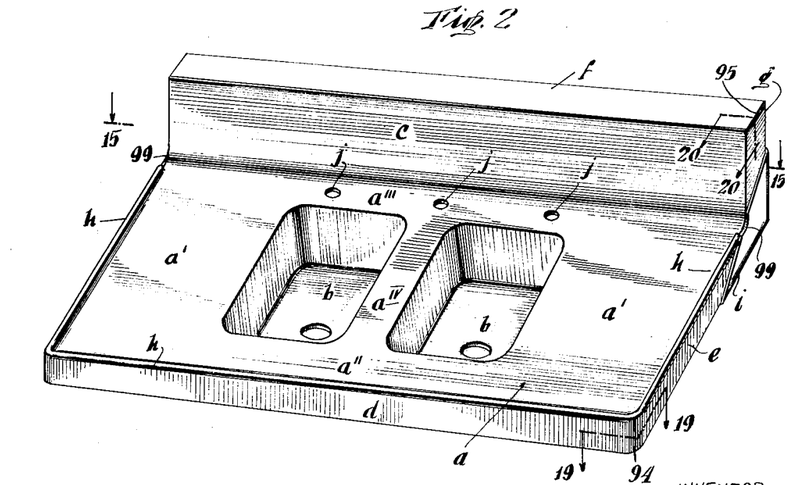
Fig. 2 is a perspective view of a fully assembled counter top having a pair of sink wells, constructed in accordance with the teachings of this invention.

The improved sink construction, as generally illustrated in Figs. 1 and 2, comprises a metal clad table part having a table section $a$ which may have one or more sink wells $b$ positioned and arranged therein as may be desired. The metal clad table section $a$ presents side drain portions $a'$ at each side of the sink well $b$, a front ledge portion $a''$ extending at the front of the sink well $b$, and a rear ledge portion $a'''$ extending along the rear edge of the sink well $b$. Where two sink wells $b$ are employed as shown in Fig. 2, the sink wells may be spaced apart so that the table section $a$ presents an intermediate ledge portion $a^{IV}$ between the spaced sink wells $b$.

The table section $a$ merges smoothly into a rear splash part which may rise any desired distance to protect the building wall adjacent to which the counter top is mounted. The front edge of the table section $a$ merges into a downwardly extending front apron section $d$, and the side edges of the table section $a$ merge into downwardly extending front apron sections $e$. The splash part comprises a main splash section $c$ which merges into a horizontally extending shelf section $f$ and into vertical end sections $g$. The front edge and the side edges of the table section $a$ are surrounded by a raised rim $h$ approximately $\frac{3}{16}$ to $\frac{1}{4}$ of an inch in height and adequate to prevent liquids deposited upon the table section from overflowing to the floor. Shoe sections $i$ may be secured to the rear corners of the counter top to further stiffen and strengthen the construction and give the counter top a finished appearance. The rear ledge portion $a''$ of the table section $a$ may be provided with suitable openings $j$ for the convenient attachment of faucets and like plumbing fixtures.

Counter tops of the type generally above described may be economically fabricated and constructed to provide a highly serviceable and longlasting construction of marked beauty and appearance, from a metal facing sheet $m$ of relatively light gauge metal, preferably from a stainless steel sheet, which need not have a greater thickness than 18 gauge. The metal facing sheet is backed up, reinforced and stiffened by fibrous backing panels or sections $p$ which may comprise laminated plywood, hard pressed fibre board, composition board and like serviceable sheathing, as used in the building industry. The metal facing sheet $m$ may be purchased unfinished and unpolished, cut to rectangular shape of sufficient dimensions to form the counter top. The metal facing sheet is sanded or polished to the desired finish on one side thereof only, preferably before any cutting or fabrication operations are performed thereon.

Figure 3:
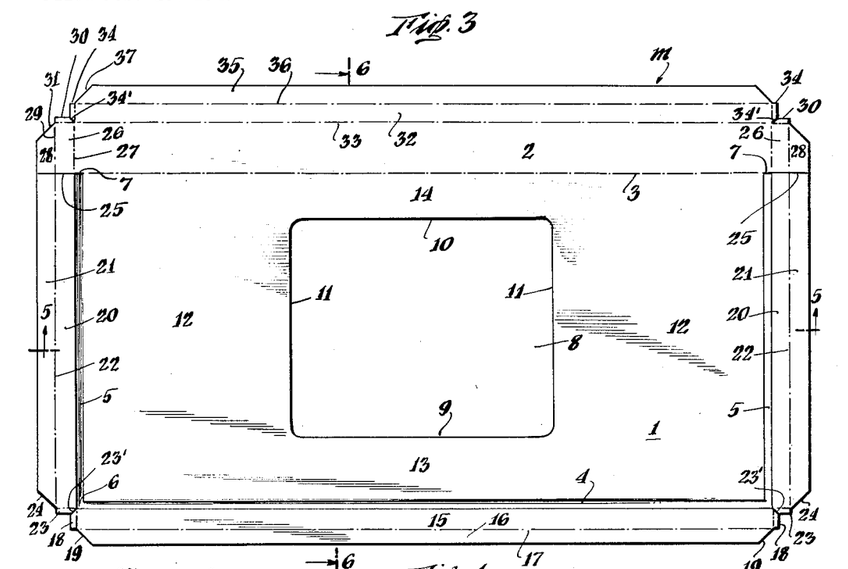
Fig. 3 is a top plan view of the metal clad panel which has been cut and shaped ready for formation into the improved counter construction, this view particularly showing the shape and formation of the metal sheet which is to form the metal facing surfaces of the finished counter top.

The metal facing sheet $m$ is cut and shaped into the general form as illustrated in Fig. 3 to provide the table section 1 and the splash section 2 joined by an imaginary line of bend 3. The front edge of the table section 1 of the metal sheet is bent upwardly at an angle to form a rim formation 4, and the side edges of the table section 1 are bent upwardly to form raised rim formations 5 shown more particularly in Figs. 3 to 6 inclusive. The adjacent ends of the front rim formation 4 and the side rim formations 5 merge together to provide a continuous raised corner formation 6. The side rim formations 5 terminate as at 7 adjacent the imaginary bend line 3.

A sink well opening 8 may be cut out of the table section 1 of the metal facing sheet, and if desired two such sink well openings in spaced relationship may be provided. The sink well opening 8, cut in the table section 1 of the metal sheet, is defined by a front edge 9, a rear edge 10 and side edges 11 so that the metal table section 1 presents side drain portions 12, a front ledge portion 13, and a rear ledge portion 14.

The metal facing sheet is also provided with a front apron section 15 extending from the front rim formation 4, and a front flange section 16 which will be later inturned along imaginary bend line 17 which parallels the raised front rim formation 4. A lip portion 18 extends from each end of the front flange section 15. Each end 19 of the front flange section 16 is preferably cut at a 45° angle.

A side apron section 20 extends laterally from the side rim formation 5 and is provided with a side flange section 21 which is later to be bent and inturned along a bending line 22 which parallels the adjacent raised side rim 5. The front end of each side apron section 20 is provided with an overhanging lip portion 23 which is separated from the adjacent lip portion 18 by an angular cut 23'. The front end 24 of each side flange section 21 is also preferably cut on a miter. The rear end of each of the side apron sections 20 and side flange sections 21 are separated from the splash section 2 by a cut line 25 which forms substantially a continuation of the imaginary bend line 3.

The splash section 2 has an end section 26 at each end thereof which, during fabrication of the counter top, will be bent rearwardly along a bending line 27 which is substantially in alignment with the side forming rims 5 of the table section 1. Each end section 26 has a flange section 28 which will be bent along a bending line 29 when shaped into counter top form. Each end section 26 and its associated flange section 28 are separated from the adjacent side apron section 20 and side flange section 21 of the table section 1 of the metal facing sheet by the cut or slit line 25 as shown in Fig. 3. The splash section 2 is provided with a top shelf section 32 which is bent rearwardly along the bending line 33 which parallels the bending line 3. A flange section 35 also forms a part of the splash section 2 and when formed will be bent inwardly along the bending line 36 which parallels the bending line 33.

The upper end of each end section 26 of the splash part is provided with a lip portion 30 which is separated from a similar lip portion 34 extending from the adjacent end of the top shelf section 32 by a miter cut 34'. The upper end 31 of each end flange section 28 is cut on a bias, and the adjacent end 37 of the flange section 35 of the shelf section 32 is likewise cut on a bias.

It will thus be appreciated that the metal facing sheet $m$ to which the fibrous backing sheets or sections $p$ are attached is polished and finished on its top or exposed face and is formed from a single metal sheet. The metal facing sheet, prior to shaping into counter top form, may have the sink well opening 8 cut in the table section 1 thereof, the table section being defined by the front rim formation 4 and the side rim formations 5. The front apron section 15 and its associated front flange section 16, and also the side apron sections 20 and their associated side flange sections 21, will lie in the same flat plane, and will be slightly elevated above but otherwise extend parallel to the table forming section 1 as shown more particularly in Figs. 3, 5 and 6. The shelf section 32 and flange section 35, and the end sections 26 and their associated flange sections 28, will extend in the same flat plane as the splash section 2.

Figure 4:
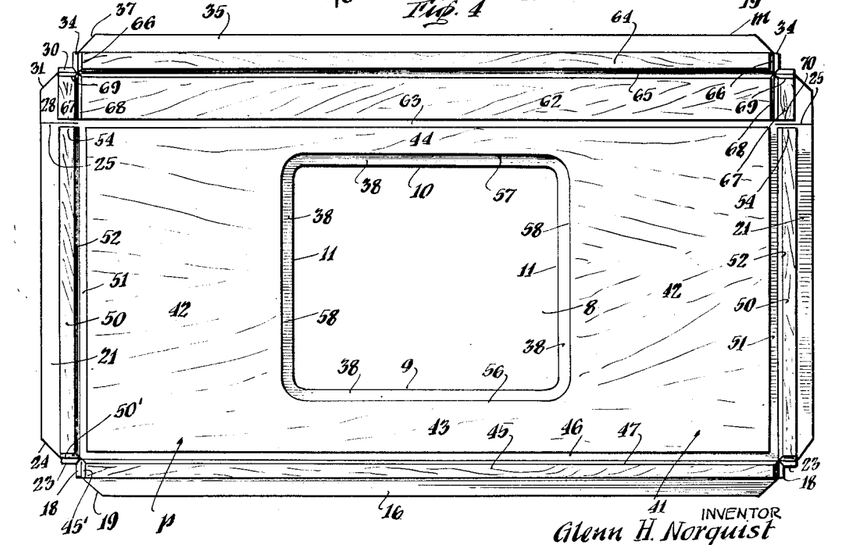
Fig. 4 is an underside plan view of the metal clad panel ready for formation into the improved counter top construction, this view particularly showing the fibrous panel sections cemented to the metal facing sheet to provide the requisite reinforcing backing for the metal facing surfaces of the finished construction.
Figure 5:
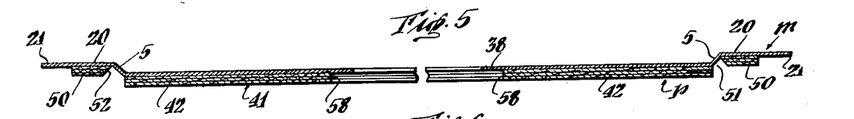
Fig. 5 is a longitudinal cross sectional view through the metal clad panel as the same appears prior to shaping into counter top form, this view being taken along line 5—5 of Fig. 3.
Figure 6:
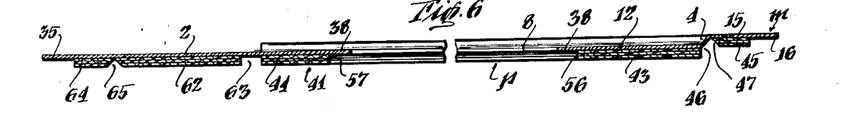
Fig. 6 is a transverse cross sectional view through the metal clad counter forming panel as the same appears when viewed along line 6—6 of Fig. 3.

The fibrous backing sections $p$ are adhesively secured to the underside of the metal facing sheet $m$ in the manner more particularly shown in Figs. 4, 5 and 6. The backing sections are preferably approimxately $\frac{1}{4}$ inch in thickness, but may be from $\frac{1}{8}$ inch to $\frac{1}{2}$ inch or more in thickness, as determined by the character of the fibrous backing material employed.

The fibrous backing comprises a table backing section 41 adhesively secured to and covering the under face of the table forming section 1 of the metal facing sheet. The table backing section 41 may have a sink well opening cut therein which is slightly larger than the sink well opening 8 of the table forming metal section 1, so that the metal sheet defines an overhanging flange 38 between the front edge 56 of the backing sheet and the front edge 9 of the metal sheet, between the rear edge 57 of the backing sheet and the rear edge 10 of the metal sheet, and between the side edges 58 of the backing sheet and the adjacent side edges 11 of the metal sheet, as shown more particularly in Fig. 4. The overhanging flange 38 of the metal sheet provides a means for securing the sink well structure b to the table forming section 1 of the metal sheet. As thus constructed, the drain backing portions 42 provide stiffening support for the drain board sections 12 of the metal sheet, while the front backing portion 43 and the rear backing portion 44 provides support for the front ledge portion 13 and the rear ledge portion 14 of the table forming section 1 of the metal sheet.

A front apron backing section 45 covers and is bonded to the rear face of the front apron section 15 of the metal sheet and extends between the front rim formation 4 and the bending line 17 of the metal sheet, but terminates short of the lip portions 18 thereof. The front apron backing section 45 is thus spaced as by an open groove 46 from the adjacent front edge of the table backing section 41, so that the metal rim formation 4 is uncovered by fibrous backing, as shown in Figs. 4 and 6. The front flange section 16 of the metal sheet may be uncovered and free of fibrous backing.

A side apron backing section 50, as shown in Figs. 4 and 5, covers and is bonded to the rear face of each side apron section 20 of the metal sheet, and is spaced from the adjacent side edge of the table backing section 41 by a groove 51 which leaves the under side of the side rim formations 5 of the metal sheet exposed. The rear face of the side flange sections 21 and the lip portions 23 of the metal sheet are likewise uncovered. The side edge 52 of the side apron backing section 50 and the side edge 47 of the front apron backing section 45 are cut on a bias of approximately 45° angle as illustrated in Figs. 3, 5 and 6.

A splash backing section 62 and a shelf backing section 64 cover the under face of the splash section 2 and shelf section 32 of the metal sheet, as shown more particularly in Figs. 4 and 6. The splash backing section 62 is spaced from the adjacent edge of the table backing section 41 by an open rectangular groove 63 which leaves the metal sheet along the imaginary bend line 3 exposed. The splash backing section 62 and shelf backing section 64 are separated by a V groove cut 65 which overlies the bending line 33 of the metal sheet. End backing sections 67 cover the end sections 26 of the metal sheet, each end backing section 67 being separated from the adjacent splash backing section 62 by a V groove 68 as shown in Fig. 4 which is substantially in alignment with the open groove 51 which separates the adjacent side apron backing section 50 from the table backing section 41. It will be noted that the top flange section 35, the end flange sections 28 and the lip portions 30 and 34 of the splash section 2 of the metal sheet, are exposed and not covered by fibrous backing. The rear end 54 of the side apron backing section 50 and the adjacent end 70 of the end backing section 67 are square cut and spaced apart approximately the width of the rectangular groove 63 and in alignment therewith, leaving the cuts 25 in the metal sheet exposed.

Figures 12, 13, 19, 20:
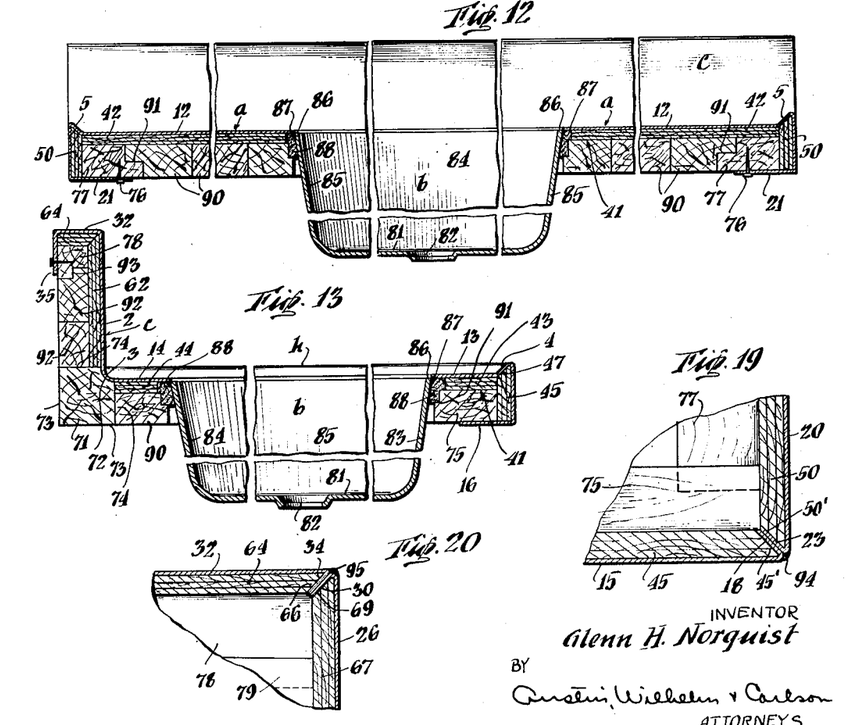
Fig. 12 is an enlarged longitudinal cross sectional view of the fully assembled counter top as the same would appear when viewed along line 12—12 of Figs. 1 and 11.
Fig. 13 is an enlarged transverse cross sectional view of the fully assembled counter top as the same would appear when viewed along line 13—13 of Figs. 1 and 11.
Fig. 19 is an enlarged horizontal cross sectional view taken through the front corner of the table section of the counter top, as the same would appear when viewed along line 19—19 of Figs. 1 and 2.
Fig. 20 is an enlarged fragmentary cross sectional view taken through the corner of the splash part, as the same would appear when viewed along line 20—20 of Figs. 1 and 2.

The upper ends 69 of the end backing sections 67 are cut on a miter in substantial alignment with the V groove 65. The ends 66 of the shelf backing section 64 are likewise cut on a miter as shown in Fig. 4. The front ends 50' of the side backing sections 50 are cut on a 45° miter, and the adjacent ends 45' of the front apron backing section 45 are likewise cut on a mitre of 45°. The lip portions 18 of the metal sheet are bent so as to overlie the mitered ends 45' of the front apron backing section 45, the lip portions 23 are bent to overlie the mitered ends 50' of the side apron backing sections 50 as shown in Fig. 19. The lip portions 30 are also bent to overlie the adjacent mitered ends 69 of the end backing section 67, and the lip portions 34 are bent to overlie the mitered ends 66 of the shelf backing section 64 as shown in Fig. 20. The metal clad panel as thus assembled is ready for final shaping into counter top formation.

Figure 7:
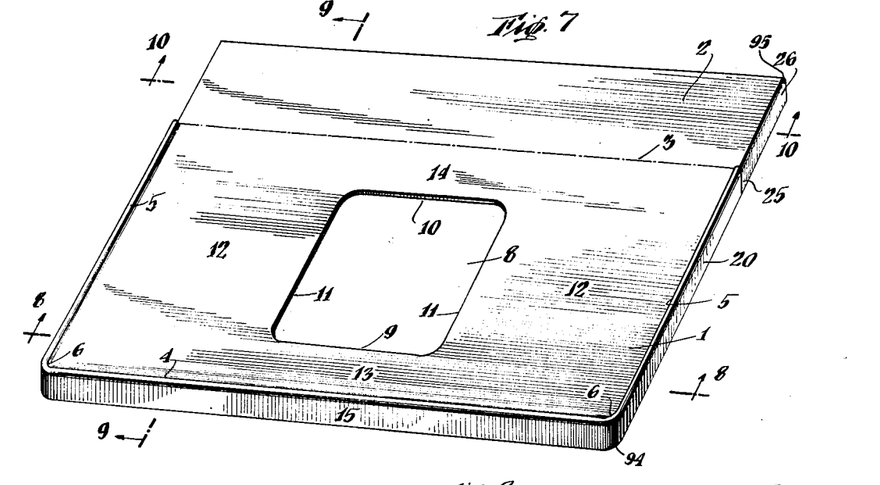
Fig. 7 is a perspective view of the metal clad panel shown in Figs. 3 and 4, as the same would appear after the front and side apron sections of the table part, and the top and end sections of the splash part, have been shaped into counter forming position.
Figure 8:
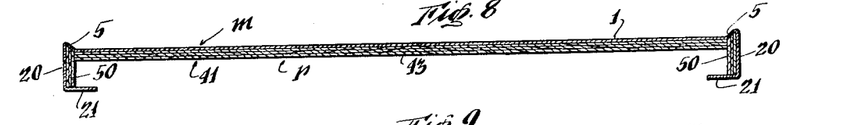
Fig. 8 is a longitudinal cross sectional view through the table part of the partially formed counter top as the same would appear when viewed along line 8—8 of Fig. 7.
Figure 9:
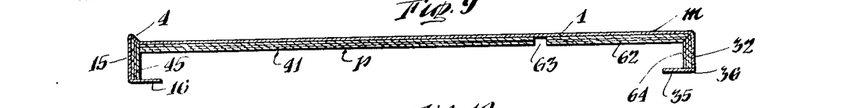
Fig. 9 is a transverse cross sectional view of the partially assembled counter top as the same would appear when viewed along 9—9 of Fig. 7.
Figure 17:
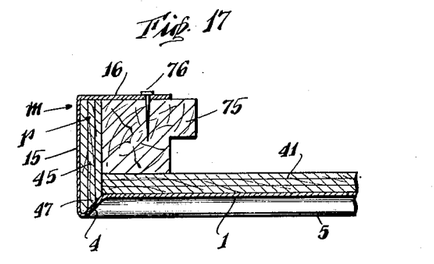
Fig. 17 is an enlarged fragmentary cross sectional view taken through the front apron section of the counter top as the same would appear when viewed along line 17—17 of Fig. 11.
Figure 18:
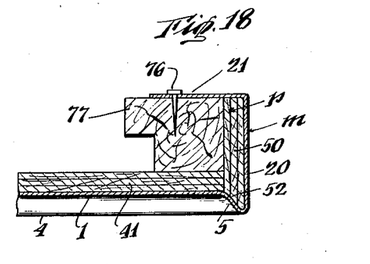
Fig. 18 is an enlarged fragmentary cross sectional view taken through the side apron section of the counter top as the same would appear when viewed along line 18—18 of Fig. 11.

The front apron d of the sink is formed by bending the front apron section 15 of the metal sheet to extend approximately at right angles to the table forming section 1 of the metal sheet, and the side aprons e of the sink are formed by bending the side apron sections 20 of the metal sheet at right angles to the table forming sections 1 thereof, as shown in Figs. 7, 8 and 9. When this operation is performed, the mitered edge 47 of the front apron backing section 45 will swing into the space provided by the groove 46 to provide a firm supporting backing for the rim formation 4 as shown in Figs. 9 and 17. Likewise the mitered edge 52 of the side apron backing sections 50 will swing into the adjacent grooves 51 and snugly fit against the under side of the side rim formations 5 to provide a firm backing support for the metal rim formation 5 of the metal sheet as shown in Figs. 8 and 18. The cuts 25 in the metal sheet will readily permit the side apron forming operations. The metal facing sheet will thus be tightly stretched, and wrinkling thereof prevented by reason of the backing sections secured to the under side thereof. It will also be noted that when the front and side aprons are thus formed, that the adjacent lip portions 18 and 23 at the front corners of the sink will be brought into face-to-face abutment as illustrated in Fig. 19.

Figure 10:
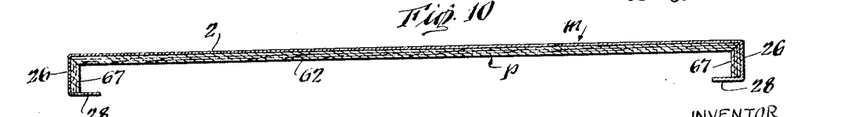
Fig. 10 is a longitudinal cross sectional view of the partially formed splash part as the same would appear when viewed along line 10—10 of Fig. 7.

The end sections 26 of the metal sheet are bent along the bending lines 27 to extend substantially at right angles to splash section 2 of the metal sheet as shown in Figs. 7 and 10, thereby also bringing the adjacent edges of the splash backing section 62 and the end backing section 67, separated by the V groove 68, into edge-to-edge abutment. The top shelf section 32 of the metal sheet is bent along the bending line 33 to extend substantially at right angles to the metal splash section 2 as shown in Figs. 7 and 9, thus bringing the adjacent mitered edges of the splash backing section 62 and the shelf backing section 64 at the V groove 65 into firm abutment. It will also be noted by referring to Fig. 20 that the inturned lip portion 30 of each metal end section 26 and the adjacent lip portion 34 of the metal shelf section will also be brought into face-to-face abutment.

Before the above bending operations are performed, adhesive may be deposited in the grooves 46 and 51 so that the mitered edges 47 and 52 of the front apron backing section 45 and the side apron backing sections 50 will become firmly and adhesively secured to the under face of the metal rim formations 4 and 5 respectively. By also placing adhesive in the V grooves 65 and 68, the adjacent mitered edges of the shelf backing section 64 and the main splash backing section 62 may be firmly bonded together, and also the adjacent mitered edges of the end backing sections 67 and the adjacent ends of the main splash backing section 62 may be firmly bonded together.

Figure 11:
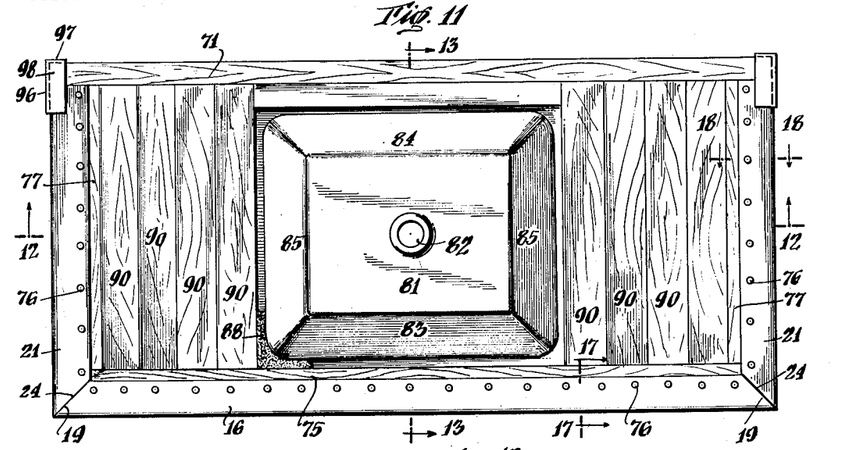
Fig. 11 is an underside view of the fully assembled counter top shown in Fig. 1, this view illustrating further structural details thereof.
Figure 14:
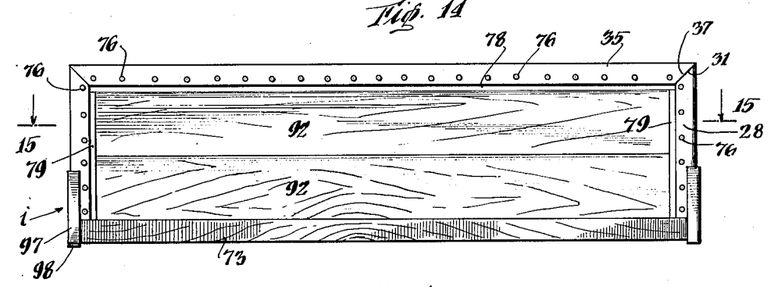
Fig. 14 is a rear face view of the splash part of the fully assembled counter top, this view illustrating certain structural details thereof.

As shown more particularly in Figs. 8, 9 and 10, the metal top flange section 35 is bent along bending line 36 to extend substantially at right angles to the metal shelf forming section 32, and metal end flange sections 28 are bent along bending lines 29 to extend substantially at right angles to the metal end sections 26 of the splash panel. The front flange section 16 and the side flanges 21 of the metal sheet are likewise turned inwardly to extend substantially parallel to the table forming section 1 of the metal sheet. When this is accomplished, the adjacent mitered ends 19 and 24 of the side flange sections 21 and front flange section 16 of the metal sheet will be substantially in abutment as shown in Fig. 11. Similarly, the mitered ends 31 of the end flange sections 28 and the adjacent mitered ends 37 of the top flange section 35 of the metal sheet will also be substantially in abutment as illustrated in Fig. 14.

Upon completion of the construction as shown in Figs. 7 through 10 inclusive, it will be noted that the table forming section 1 of the metal sheet is firmly stiffened and supported by the table backing section 41, the front apron section 15 and front rim formation 4 of the metal sheet is supported and reinforced by the front backing section 45, and the side apron sections 20 and the side rim formations 5 of the metal sheet are supported and reinforced by the side backing sections 50. The main splash section 2, the top shelf section 32 and the end sections 26 of the metal sheet are firmly and rigidly supported and reinforced by the main splash backing section 62, the shelf backing section 64 and the end backing sections 67 respectively.

By reason of the fibrous backing sections which cover the entire area of the metal table section 1, the front and side apron sections 15 and 20, the splash section 2, the top shelf section 32 and the end sections 26 of the metal facing sheet, a sound deadening effect is achieved, so that the improved counter top is free from metallic ring or sound when drummed upon. The application of fibrous backing sections to the sheet metal panel prior to bending formation thereof, permits the use of a relatively light gauge metal facing sheet which is prevented from wrinkling and warping by the backing sections adhesively bonded thereto. By constructing the counter top in the manner above described, the exposed face of the metal sheet may be sanded and finished rapidly and economically in its flat condition and before any forming operations are executed thereon, thus avoiding the more difficult and time consuming finishing operations normally necessary after the sink has been constructed. By forming the facing surface of the sink from a single piece of sheet metal, crevices and cracks in which foreign matter may gather and provide a source of leaks, is substantially avoided. Extensive and time consuming welding and soldering operations, heretofore necessary on stainless steel sinks as heretofore constructed, are also obviated.

The table forming section $a$ of the sink is further stiffened and reinforced by a front wood edging strip 75 which is inserted under the inturned front flange 16 and extends the full length of the table section as shown more particularly in Figs. 11, 13 and 17. The wood edging strip 75 may be adhesively secured to the adjacent backing sections 41 and 45, and the metal flange section 16 may be secured to the wood edging strip 75 as by screws or nails 76. A wood side edging strip 77 is inserted under each of the metal side flange sections 21, and extends the full width of the table section, as shown more particularly in Figs. 11 and 18. Each side edging strip 77 may be adhesively secured to the adjacent backing sections 41 and 50, and may be secured to the adjacent inturned metal flange section 21 as by screws or nails 76.

Figures 15, 16:
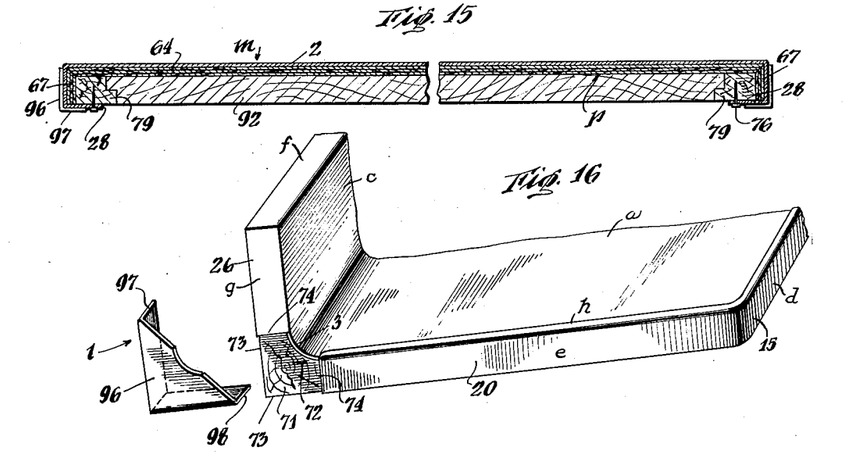
Fig. 15 is a longitudinal cross sectional view of the splash part of the fully assembled counter top as the same would appear when viewed along line 15—15 of Figs. 1, 2 and 14.
Fig. 16 is a fragmentary perspective view showing one end of the counter top, and the corner shoe prior to application to the construction.

A wood edging strip 78 may be set to extend under the inturned top flange 35 of the splash part as shown more particularly in Figs. 13 and 14, preferably extends the full length of the splash part and is secured to the inturned top flange section 35 as by screws or nails 76. A side edging strip 79 of wood is inserted under each of the inturned end flange sections 28 of the splash part and is secured in position as by screws or nails 76 as shown in Figs. 14 and 15. The top edging section 78 and the side edging sections 79 may be additionally secured in position by adhesive applied to the adjacent areas of the splash backing section 62, shelf backing section 64, and end backing sections 67. Thus the table part and the splash part of the counter top are additionally stiffened and reinforced by wood edging strips which positively prevent deformation of the construction.

The splash section 2 of the metal sheet is bent to extend substantially at right angles to the table forming section 1 thereof along the bending line 3 as shown in Figs. 13 and 16. The bend 3 is given a rounded curvature, approximately ½ inch in arcuate length, which is made possible by the open groove 63 formed between the table backing section 41 and the splash backing section 62. This operation can be performed by forming the bend 3 around a mandrel having the proper curvature. A wood stiffening bar 71 having a rounded edge contour 72 is snugly fitted against the rear face of the rounded metal bend 3, and may be adhesively secured thereto. The outside faces 73 of the stiffening bar extends substantially flush with the adjacent inturned flange sections 21 and 28 of the metal facing sheet. The other two side faces 74 of the wood stiffening bar 71 are so formed as to firmly abut against the adjacent ends of the side stiffening strips 77 of the table part and the side stiffening strips 79 of the splash part, to thereby support and retain the splash panel $c$ in the desired right angle relationship with respect to the table section $a$ of the construction.

The sink well $b$ may be formed from stamped sheet metal, preferably stainless steel, of somewhat heavier gauge than the panel forming metal sheet $m$. The sink well may be of any desired shape or form designed to fit within the well opening 8 of the table section of the metal sheet. As shown more particularly in Figs. 11, 12 and 13, the sink well $b$ presents a bottom forming wall 81 provided with a suitable drain opening 82 to which the sink drainage fixture is secured. The sink well $b$ is enclosed by a front wall 83, a rear wall 84 and side walls 85 of any desired depth. The upper edge 86 of the enclosing walls of the sink well are secured to the exposed flange portions 38 of the metal table forming section 1 as by soldering or welding metal 87, so as to provide a leak tight joint between the sink well b and the table forming section 1 of the metal facing sheet.

To further stiffen and strengthen the construction, the under side area of the table section between the front edging strip 75, side edging strips 77 and rear stiffening bar 71, may be filled in with wood or fibrous filler boards 90 as shown more particularly in Figs. 11, 12 and 13. The front edging strip 75, the side edging strips 76 and the rear stiffening bar 71 may be notched or grooved as at 91 to lock the filler boards 90 thereto. The filler boards 90 may also be adhesively secured to the edging strips 75 and 77, to the stiffening bar 71, and to the table backing section 41. Wood or fibrous filler boards 92, shown in Figs. 14 and 15, may be applied to the rear face of the splash panel c. The filler boards 92 preferably have a notched interlock as at 93 with the edging strips 78 and 79 of the splash panel. The filler boards 92 may additionally be adhesively secured to the edging strips 78 and 79 and to the rear face of the splash backing section 62. The filler boards 90 and 92 provide additional reinforcing, insuring a finished counter top of great strength and rigidity, and yet relatively light in weight. Suitable waterproof packing 88, such as a bituminous or gummy compound, may be packed between the outside faces of the enclosing walls 83, 84 and 85 of the sink well b and the adjacent edges of the filler boards 90, and the surrounding edges 56, 57 and 58 of the table backing section 41. The filler boards 90 and 92 may be slightly spaced apart at the time of installation to permit normal expansion of the board material.

It will be noted that the improved counter top constructed as above described presents metal facing surfaces which substantially cover the entire sink structure and which is formed from a single metal sheet substantially rectangular in outline with a minimum material waste. To give the counter top its final finished appearance, it is desirable to apply a seam of solder or welding metal 94 to the two front corners thereof as shown in Figs. 1, 2 and 19, to firmly secure together the inturned lip portions 18 and 23 into integral union. The solder or welding seam 94 may be burnished or finished off to give the corner a finished appearance. A seam of solder or welding metal 95 is also applied to each upper corner of the splash panel c so as to form an integral bond between the inturned lip portions 30 and 34 thereof, as shown in Figs. 1, 2 and 20. These soldered or welded corners can then be smoothed off by a simple burnishing operation.

In forming the counter top from a single sheet of facing metal m in the manner above described, the ends of wood stiffening bar 71 would not be covered by metal sheeting. Where the sides of the counter top are to abut against a wall or cabinet, metal coverage of the ends of the stiffening bar 71 may be unnecessary. However, the ends of the stiffening bar 71 may be easily covered by the provision of a shoe i formed from a metal sheet shaped as shown in Fig. 16 to present a generally triangular shaped side facing portion 96, a vertical flange portion 97 and a horizontal flange portion 98. The sheathing shoe i is so shaped that the facing portion 96 will fully cover the exposed end of the stiffening bar 71. The vertical flange 97 of the sheathing shoe i seats over and is secured to the rear face 73 of the stiffening bar 71 and the horizontal flange 98 fits over and is secured to the horizontal face 73 of the stiffening bar 71. The sheathing shoe i is preferably made of light gauge metal so as not to appreciably project beyond the outside faces of the adjacent side apron section 20 and the adjacent end section 26 of the metal sheet. It will be appreciated that the facing portion 96 of the shoe may be cut to only cover the exposed end of the stiffening bar 71 and to lie flush with the adjacent side apron section 20 and the adjacent end section 26 of the metal facing sheet, with the joint seam therebetween welded or soldered together. Solder or welding metal is applied as at 99 between the ends of the rounded bend 3 and the facing portion 96 of the sheathing shoe i to form a leak-proof joint therebetween as shown in Figs. 1 and 2.

In this improved counter top construction it will be noted that a minimum of soldering or welding operations are required. In addition to the simple welding or soldering operation required to attach the sink well b to the projecting flange 38 of the metal table forming section 1, two simple front corner welds 94 at the front corners of the table section a, and two simple corner welds 95 at the upper corners of the splash panel c are applied. After the application of the corner shoes i, sealing welds 99 are applied at the ends of the curvilinear bend 3. All of these welding and soldering operations are limited in extent, simple to perform, and can be rapidly executed.

Metal clad sinks and counter tops may be made in accordance with this invention having a table forming section a of any desired width and length to best satisfy the supporting cabinet requirements. For example, the table section may vary from one foot to ten feet or more in length and may vary from one foot to five feet in width. The front apron section d and the side apron sections e may vary from one inch to ten or more inches in height. The splash panel c may be made from a few inches to two or three feet in height, and the shelf section f thereof may be made of any desired width ranging from one inch to a foot or more. It will thus be appreciated that this improved cabinet top construction may be manufactured to satisfy any dimensional requirements.

Metal clad sinks and cabinet tables constructed as above described are unusually light in weight, since strength is achieved by the use of relatively light fibrous backing sections and wood or fibrous filler boards and strips. The counter top nevertheless possesses unusual strength and rigidity and will not warp or deform during manufacture, or during shipment, or while in use. Counter tops constructed in accordance with this invention may be provided with one or more sink wells as desired, with any desired arrangement of openings j for attachment of plumbing fixtures. These counter tops are designed to snugly fit and seat upon any desired supporting structure, and the inturned flanges 15 and 20 and the securing screws or nails 76 are designed to be substantially concealed by the cabinet structure upon which the sink is supported.

Stainless steel sinks and cabinet tables constructed in accordance with this invention are particularly designed for mass production at a price well within the reach of the modest home owner, and at a greatly reduced cost as compared with stainless steel sinks heretofore provided. These sinks and cabinet tables are lasting in use, are designed to be supported upon and easily fitted to any desired cabinet structure and to the interior wall of the building in which they are placed, and provide a construction of lasting utility, highly attractive and appealing appearance and finish.

While certain novel features of the invention have been disclosed herein, and are pointed out in the annexed claims, it will be understood that various omissions, substitutions, and changes may be made by those skilled in the art without departing from the spirit of the invention.

What is claimed is:

1. An improved counter top construction having a table part and a splash part, said table part including a table top section and front and side apron sections depending from said table section, said splash part including a main splash section terminating in a rearwardly extending shelf section and rearwardly extending end sections, said counter top being formed from a one piece metal sheet shaped to form the facing surfaces for the table section and apron sections of the table part and for the main splash section, shelf section and end sections of the splash part, fibrous backing sections bonded to said metal facing sheet to provide backing support for the table section, apron sections, main splash section, shelf section and end sections of the metal sheet, each of the apron sections, the shelf section and the end sections of the metal sheet having metal lip portions extending inwardly and overlying the adjacent mitered ends of the adjacent backing sections, the adjacent metal lip portions being in face-to-face contact, and a seam of bonding metal covering the exterior joints between adjacent inturned lip portions bonding said lip portions together in integral union, the space defined within said apron sections of the table part and the space defined within the shelf section and end sections of the splash part being filled with filler material providing a light weight counter top presenting finished metal facing surfaces supported and reinforced by said backing sections and said filler material.

2. An improved counter top construction having a table part which includes a table section, a front raised rim formation and a front apron section depending from said rim formation, and a splash part which includes a main splash section terminating in a rearwardly extending shelf section, said counter top being formed from a one piece metal sheet shaped to form the facing surfaces for the table section, rim formation and apron section of said table part and to form the facing surface of the main splash section and shelf section of the splash part, fibrous backing sections bonded to said metal facing sheet to provide backing support for the table section and front apron section of the table part, an edge of said apron backing section being shaped to substantially conform to the inner surface contour of the adjacent rim formation of said metal sheet and in substantial abutment there-against to provide backing support therefor, and fibrous backing sections bonded to said metal facing sheet to provide backing support for the main splash section and shelf section of said splash part.

3. An improved counter top construction having a table part which includes a table section, front and side raised rim formations and front and side apron sections depending from said rim formations, and a splash part which includes a main splash section terminating in a rearwardly extending shelf section, said counter top being formed from a one piece metal sheet shaped to form the facing surfaces for the table section, rim formations and apron sections of said table part and to form the facing surfaces of the main splash section and shelf section of the splash part, fibrous backing sections bonded to said metal facing sheet to provide backing support for the table section and apron sections of the table part, an edge of each apron backing section being shaped to substantially conform to the inner surface contour of the adjacent rim formation of said metal sheet and in substantial abutment there-against to provide backing support therefor, and fibrous backing sections bonded to said metal facing sheet to provide backing support for the main splash section and shelf section of said splash part.

4. An improved counter top construction having a table part which includes a table section, front and side raised rim formations, and front and side apron sections depending from said rim formations, and a splash part which includes a main splash section terminating in a rearwardly extending shelf section and rearwardly extending end sections, said counter top being formed from a one-piece metal sheet shaped to form the facing surfaces for the table section, rim formations and apron sections of said table part and to form the facing surfaces of the main splash section, shelf section and end sections of the splash part, fibrous backing sections bonded to said metal facing sheet to provide backing support for the table section, rim formations and apron sections of the table part, and fibrous backing sections bonded to said metal facing sheet to provide backing support for the main splash section, shelf section and end sections of said splash part, the space defined within said apron sections of the table part and the space defined within the shelf section and end sections of the splash part being filled with fibrous filler providing a light weight counter top presenting finished metal facing surfaces supported and reinforced by backing sections and fibrous filler.

5. An improved counter top construction having a table part and a splash part, said table part including a table top section, front and side apron sections depending from said table section, and flange sections extending inwardly from said apron sections, said splash part including a main splash section terminating in a rearwardly extending shelf section and rearwardly extending end sections, said counter top being formed from a one-piece metal sheet shaped to form the facing surfaces for the table section, apron sections and flange sections of the table part, and to form the facing surfaces for the main splash section, shelf section and end sections of the splash part, fibrous backing sections bonded to said metal facing sheet to provide backing support for the table section, apron sections, main splash section, shelf section and end sections of the metal facing sheet, and a stiffening frame formed from stiffening strips of fibrous material seating within the pocket formed by the adjacent apron sections and associated flange sections providing a counter top presenting finished metal facing surfaces supported and reinforced by said backing sections and stiffening frame.

6. An improved counter top construction having a table part which includes a table section, front and side apron sections depending from said table section, and flange sections extending inwardly from said apron sections, and a splash part which includes a main splash section terminating in a rearwardly extending shelf section and rearwardly extending end sections, and flange sections extending inwardly from said shelf section and end sections, said counter top being formed from a one piece metal sheet shaped to form the facing surfaces for the table section, apron section and flange sections of said table part, and to form the facing surfaces of the main splash section, shelf section, end sections and inturned flange sections of the splash part, fibrous backing sections bonded to said metal facing sheet to provide backing support for the table section and apron sections of the table part, fibrous backing sections bonded to said metal facing sheet to provide backing support for the main splash section, shelf section and end sections of said splash part, stiffening strips seating against the inside faces of said apron backing sections providing a stiffening frame for the table part, stiffening strips seating against the shelf backing section and end backing sections of said splash part providing a stiffening frame for said splash part, and an intermediate stiffening bar at the rear of said table section joining said splash stiffening frame and table stiffening frame.

7. An improved counter top construction having a table part which includes a table section, front and side raised rim formations, and front and side apron sections depending from said rim formations, and a splash part which includes a main splash section terminating in a rearwardly extending shelf section and rearwardly extending end sections, said counter top being formed from a one piece metal sheet shaped to form the facing surfaces for the table section, rim formations and apron sections of said table part, and to form the facing surfaces of the main splash section, shelf section and end sections of the splash part, fibrous backing sections bonded to said metal facing sheet to provide backing support for the table section, rim formations and apron sections of the table part, fibrous backing sections bonded to said metal facing sheet to provide backing support for the main splash section, shelf section and end sections of said splash part, stiffening strips seating against the inside faces of said apron backing sections providing a stiffening frame for the table part, and stiffening strips seating against the shelf backing section and end backing sections of said splash part providing a stiffening frame for said splash part.

8. An improved counter top construction having a table part and a splash part, said table part including a table top section and front and side apron sections depending from said table section, said splash part including a main splash section terminating in a rearwardly extending shelf section, said counter top being formed from a one piece metal sheet shaped to form the facing surfaces for the table section and apron sections of the table part and the main splash section and shelf section of the splash part, and fibrous backing sections bonded to said metal facing sheet to provide backing support for the table section, apron sections, main splash section, and shelf section of the metal facing sheet, each of the apron sections of the metal sheet having a lip portion at the adjacent ends thereof extending inwardly and overlying the adjacent mitered end of the adjacent apron backing section, the adjacent metal lip portions being in face-to-face contact, and a seam of bonding metal covering the exterior joint between said inturned lip portions bonding said lip portions into integral union.

9. An improved counter top construction having a table part and a splash part, said table part including a table top section and front and side apron sections depending from said table section, said splash part including a main splash section terminating in a rearwardly extending shelf section and rearwardly extending end sections, said counter top being formed from a one-piece metal sheet shaped to form the facing surfaces for the table section and apron sections of the table part and the main splash section, shelf section and end sections of the splash part, and fibrous backing sections bonded to said metal facing sheet to provide backing support for the table section, apron sections, main splash section, shelf section and end sections of the metal facing sheet, the adjacent ends of said shelf section and end sections of the metal sheet having a metal lip portion extending inwardly and overlying the adjacent mitered end of the adjacent backing section, the adjacent metal lip portions being in face-to-face contact, and a seam of bonding metal covering the exterior joints between said inturned lip portions bonding said lip portions into integral union.

10. An improved counter top construction having a table part and a splash part, said table part including a table top section and front and side apron sections depending from said table section, said splash part including a main splash section terminating in a rearwardly extending shelf section and rearwardly extending end sections, said counter top being formed from a one-piece metal sheet shaped to form the facing surfaces for the table section and apron sections of the table part and the main splash section, shelf section and end sections of the splash part, fibrous backing sections bonded to said metal facing sheet to provide backing support for the table section, apron sections, main splash section, shelf section and end sections of the metal facing sheet, each of the apron sections, the shelf section and the end sections of the metal sheet each having a metal lip portion extending inwardly and overlying the adjacent mitered end of the adjacent backing section, the adjacent metal lip portions being in face-to-face contact, and a seam of bonding metal covering the exterior joints between adjacent inturned lip portions bonding said lip portions together in integral union.

GLENN H. NORQUIST.

REFERENCES CITED

The following references are of record in the file of this patent:

UNITED STATES PATENTS

| Number | Name | Date |
|---|---|---|
| 902,700 | Vance | Nov. 3, 1908 |
| 1,664,292 | Gloekler | Mar. 27, 1928 |
| 1,965,375 | Hanlon | July 3, 1934 |
| 2,149,882 | Clements | Mar. 7, 1939 |
| 2,256,272 | Batcheller | Sept. 16, 1941 |
| 2,303,634 | Haberstump | Dec. 1, 1942 |
| 2,456,065 | Just | Dec. 14, 1948 |
| 2,472,685 | Scharmer | June 7, 1949 |